United States Patent
Chan et al.

(10) Patent No.: US 8,374,338 B2
(45) Date of Patent: Feb. 12, 2013

(54) TRANSPORT PACKET DECRYPTION TESTING IN A CLIENT DEVICE

(75) Inventors: Tat Keung Chan, San Diego, CA (US); Alexander Medvinsky, San Diego, CA (US); Stuart P. Moskovics, San Diego, CA (US); Jason A. Pasion, San Diego, CA (US); Xin Qiu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 313 days.

(21) Appl. No.: 12/708,171

(22) Filed: Feb. 18, 2010

(65) Prior Publication Data

US 2010/0215171 A1     Aug. 26, 2010

Related U.S. Application Data

(60) Provisional application No. 61/154,122, filed on Feb. 20, 2009.

(51) Int. Cl.
*H04K 1/00*        (2006.01)

(52) U.S. Cl. ............................................ 380/2

(58) Field of Classification Search .................... 380/2
See application file for complete search history.

(56) References Cited

U.S. PATENT DOCUMENTS

| | | | |
|---|---|---|---|
| 5,835,726 A * | 11/1998 | Shwed et al. ................. 709/229 |
| 7,254,236 B1 * | 8/2007 | Eskicioglu et al. ........... 380/239 |
| 2002/0129307 A1* | 9/2002 | Walker et al. ................. 714/715 |
| 2004/0088558 A1* | 5/2004 | Candelore ..................... 713/193 |

* cited by examiner

*Primary Examiner* — Kaveh Abrishamkar
*Assistant Examiner* — Ayoub Alata
(74) *Attorney, Agent, or Firm* — Thomas A. Ward

(57) ABSTRACT

In a method for testing a transport packet decrypting module of a client device, a first decryption operation of the transport packet decrypting module is implemented on a test encrypted control word using a content decryption key ladder to derive a test control word, a second decryption operation of the transport packet decrypting module is implemented on one or more test transport packets using the test control word via a predetermined content decryption algorithm, the KIV is derived from the decrypted transport packets, and the derived KIV is compared with a value stored in the client device to verify whether the transport packet decrypting module of the client device is functioning properly.

16 Claims, 4 Drawing Sheets

TRANSPORT PACKET DECRYPTION TESTING IN A CLIENT DEVICE

PRIORITY

This application claims priority to U.S. provisional patent application Ser. No. 61/154,122, filed Feb. 20, 2009, and entitled "Key Integrity Verification in Conditional Access System", which is hereby incorporated by reference in its entirety.

BACKGROUND

In a conventional conditional access system, transport streams are encrypted using a control word with a transport encryption algorithm, such as the SCTE52 algorithm. The control word is delivered to a client device, such as a set-top box, in encrypted form (Encrypted Control Word (ECW)). In general, the encryption is performed based on a hardware key ladder, which includes different levels of encryption keys, using either a system wide global key when a global key ladder is used or a device unique key when a unique key ladder is used. Typically, these keys are stored in One Time Programmable (OTP) memory.

During a normal operation, the client device uses the hardware keys in the key ladder to decrypt the ECW to derive the control word. The client device then uses the control word to decrypt a transport stream. This operation involves a number of parameters, including Initialization Vectors (IVs), used by the transport encryption algorithm and a hardware key, such as the system wide global key or the device unique key. Some of these parameters are programmed on the OTP memory of the client device during a chip programming process, while other parameters may be part of the chip hardware/firmware. The keys, parameters, and key integrity value (KIV) are programmed onto the chip during a chip manufacturing and programming process. The keys and parameters are typically not accessible to a general purpose processor on the client device. Instead, the keys and parameters are typically only accessible by a secure processor to only perform specific functions as specified in the conditional access (CA) algorithm.

Errors, such as, incorrectly programmed bits of a parameter value, have been found to occur in some OTP memories during the chip programming process. Identification of such errors throughout the life cycles of client devices is thus critical to maintaining a relatively high level of product quality. Current techniques for manufacturing and using the client devices, however, are incapable of identifying such errors in a cost-effective, efficient, and secure manner because of the protection measures employed to keep the keys and parameters secret.

SUMMARY

Disclosed herein is a method for testing a transport packet decrypting module of a client device. In the method, a first decryption operation of the transport packet decrypting module is implemented on a test encrypted control word using a content decryption key ladder to derive a test control word and a second decryption operation of the transport packet decrypting module is implemented on a test transport packet using the test control word via a predetermined content decryption algorithm. In addition, a key integrity value (KIV) is derived from the decrypted test transport packet and is compared with a value stored in the client device to verify whether the transport packet decrypting module of the client device is functioning properly.

Also disclosed herein is an apparatus for testing a transport packet decrypting module of a client device. The apparatus includes a memory storing one or more modules configured to implement a first decryption operation of the transport packet decrypting module on a test encrypted control word using a content decryption key ladder to derive a test control word, to implement a second decryption operation of the transport packet decrypting module on a test transport packet using the test control word via a predetermined content decryption algorithm, to derive a key integrity value (KIV) from the decrypted test transport packet, and to compare the derived KIV with a value stored in the client device to verify whether the transport packet decrypting module of the client device is functioning properly. The apparatus also includes a processor configured to execute the one or more modules.

Further disclosed is a computer readable storage medium on which is embedded one or more computer programs. The one or more computer programs implement a method for testing a transport packet decrypting module of a client device. The one or more computer programs comprising a set of instructions for: implementing a first decryption operation of the transport packet decrypting module on a test encrypted control word using a content decryption key ladder to derive a test control word; implementing a second decryption operation of the transport packet decrypting module on a test transport packet using the test control word via a predetermined content decryption algorithm; deriving a key integrity value (KIV) from the decrypted test transport packet; and comparing the derived KIV with a value stored in the client device to verify whether the transport packet decrypting module of the client device is functioning properly.

Through implementation of the method and apparatus disclosed herein, a KIV for a client device may be derived to verify whether the client device is performing the transport packet decryption process properly and without compromising the security of the client device. More particularly, the method and apparatus disclosed herein are configured to cause the transport packet decryption process to be performed on a test control word without having to disclose to a general purpose processor on the client device the keys or other parameters used in the client device to perform the transport packet decryption process. General purpose processors on a client device are typically less secure than a special secure processor on the same device, and are thus more susceptible to attacks. As such, general purpose processors may more easily allow an attacker to extract data from its memory and/or data buses.

In addition, because the KIV is derived through use of the transport packet decrypting module of a client device, the KIV may be compared with a previously stored KIV of the client device to determine whether the transport packet decrypting module is functioning properly. In one regard, the comparison may be used to determine whether the transport packet decrypting module of the client device is operating properly because the KIV programmed on the chip of the client device is pre-computed according to the same procedure used herein to derive the KIV. As such, the determination as to whether the transport packet decrypting module is functioning properly may be made in a relatively simple, secure, and effective manner.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Figure 1:
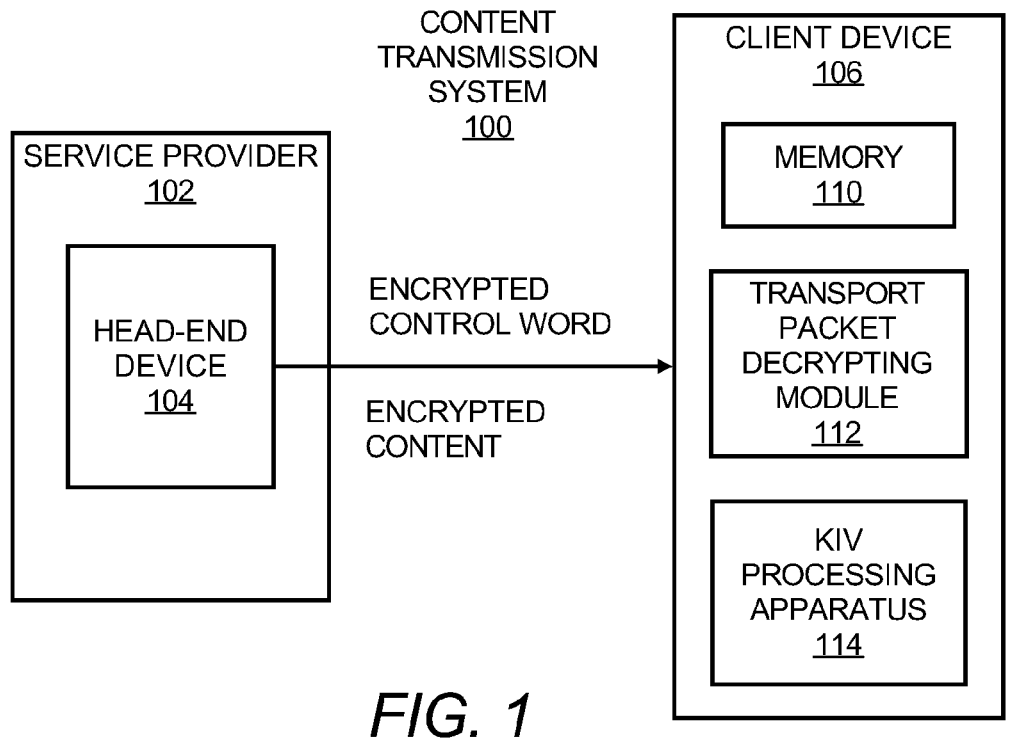
FIG. 1 illustrates a simplified schematic diagram of a content transmission system, according to an embodiment of the present invention.

With reference first to FIG. 1, there is shown a simplified schematic diagram of a simplified content transmission system 100, according to an embodiment of the present invention. It should be apparent to those of ordinary skill in the art that the diagram of FIG. 1 represents a generalized illustration and that other components may be added or existing components may be removed, modified or rearranged without departing from a scope of the content transmission system 100.

The content transmission system 100 is depicted as including a service provider 102, a head-end device 104, and a client device 106. In the content transmission system 100, content from the head end device 104 is protected and thus requires that certain criteria be met by the client device 106 prior to being granted access to the content. In one regard, the content transmission system 100 may comprise a conditional access (CA) content transmission system. Various methods and apparatuses are disclosed herein for verifying whether a transport packet decryption operation in the client device 106 is functioning properly. More particularly, a key integrity value (KIV) for the client device 106 is derived and used in determining whether the transport packet decryption operation in the client device 106 is functioning properly, as discussed in greater detail herein below.

Although the client device 106 includes other components, the client device 106 has been depicted as merely including a memory 110, such as a one-time programmable (OTP) memory, a transport packet decrypting module 112, and a key integrity value (KIV) processing apparatus 114 for purposes of simplicity. In addition, although the KIV processing apparatus 114 has been depicted as forming part of the client device 106, it should be clearly understood that the KIV processing apparatus 114 may comprise a completely separate component from the client device 106. In this instance, the KIV processing apparatus 114 may be configured to communicate with the client device 106 through any suitable wired or wireless communication path.

In any regard, the KIV processing apparatus 114 may be configured to derive a KIV for the client device 106. In addition, the KIV processing apparatus 114 may be configured to compare the derived KIV for the client device 106 with a value (such as the KIV) stored in a memory 110 of the client device 106, such as the OTP memory, to verify whether the transport packet decryption module 112 in the client device 106 is functioning properly.

The service provider 102 may be configured to transmit content, such as, CA content, via one or more program transport streams or packets to the client device 106. The content may comprise, for instance, any audio or video data or information, such as streamed audio service, streamed video service, and streamed data service or files that may be accessed by an authorized client device 106. As referred herein, a service provider 102 is an individual, a group of individuals, a company, a corporation, or any other entity that distributes content to one or more client devices 106. Examples of service providers are Cable TV (CATV) service providers, satellite TV service providers, satellite radio service providers, wireless mobile service providers, online music providers or companies, etc.

As further referred herein, the client device 106 is a device used to access content provided by a service provider, which content the user has authorization to access. Examples of client devices 106 include, but are not limited to a set-top boxes, personal computers, portable media players, cellular telephones, etc.

In the content transmission system 100, the content is encrypted with a predefined transport encryption algorithm, such as the SCTE52 algorithm. The head-end device 104 of the service provider 102 communicates with the client device 106 and delivers encrypted control word (ECW) and encrypted content, such as, encrypted CA content, to the client device 106. An example of the head-end device 104 is a server of the service provider 102. Once the encrypted content is transmitted to the client device 106, the transport packet decrypting module 112, if functioning properly, decrypts the ECW using a content decryption key ladder to derive a control word. The content decryption key ladder has different keys and may include one or more levels of cryptographic operations (such as decryption) used to derive the control word. Once the transport packet decrypting module 112 decrypts the ECW and derives the control word, the transport packet decrypting module 112 may decrypt the encrypted content using the control word.

If, however, the transport packet decrypting module 112 is not functioning properly, the transport packet decrypting module 112 will be unable to decrypt the ECW and/or the control word properly and will thus be unable to access the encrypted content. According to an embodiment, the KIV processing apparatus 114 is implemented to verify whether the transport packet decrypting module 112 is functioning properly. More particularly, the KIV processing apparatus 114 is implemented to make this determination without jeopardizing a security aspect of the client device 106. As discussed in greater detail herein below, the KIV processing apparatus 114 is configured to make this determination during the manufacture of the transport packet decrypting module 112, during a diagnosis operation of the client device 106, during a self-test of the client device 106, etc. In one regard, therefore, the KIV processing apparatus 114 has a verification function that may be performed during any part of the life cycle of the client device 106.

Figure 2:
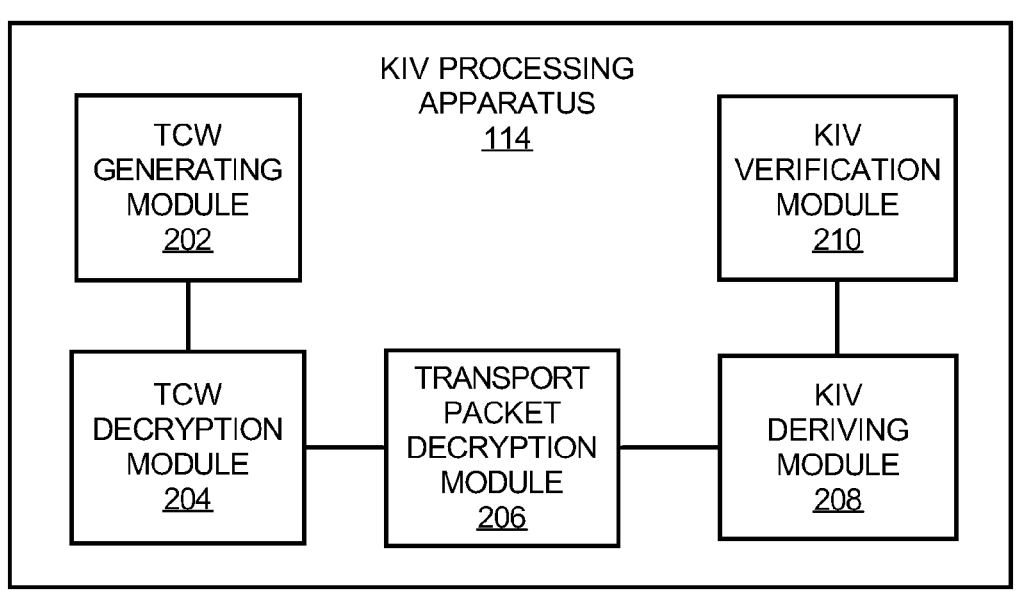
FIG. 2 shows a block diagram of the KIV processing apparatus depicted in FIG. 1, according to an embodiment of the present invention.

With particular reference now to FIG. 2, there is shown a simplified block diagram 200 of the KIV processing apparatus 114 depicted in FIG. 1, according to an embodiment of the invention. It should be apparent to those of ordinary skill in the art that the block diagram 200 of the KIV processing apparatus 114 represents a generalized illustration and that other components may be added or existing components may be removed, modified or rearranged without departing from a scope of the KIV processing apparatus 114.

As shown in FIG. 2, the KIV processing apparatus 114 includes a test control word (TCW) generating module 202, a TCW decryption module 204, a transport packet decryption module 206, a key integrity value (KIV) deriving module 208, a KIV verification module 210, and an output module 212. The modules 202-212, as well as the transport packet decrypting module 112 (FIG. 1), may comprise software modules, hardware modules, or a combination of software and hardware modules. Thus, in one embodiment, one or more of the modules 112, 202-212 comprise circuit components. In another embodiment, one or more of the modules 112, 202-212 comprise software code stored on a computer readable storage medium, which is executable by a processor. As such, in one embodiment, the KIV processing apparatus 114 comprises a hardware device that is either integrated with or separate from the client device 106. In another embodiment, the KIV processing apparatus 114 comprises software stored on a computer readable medium that is either integrated with or separate from the client device 106.

Figure 3:
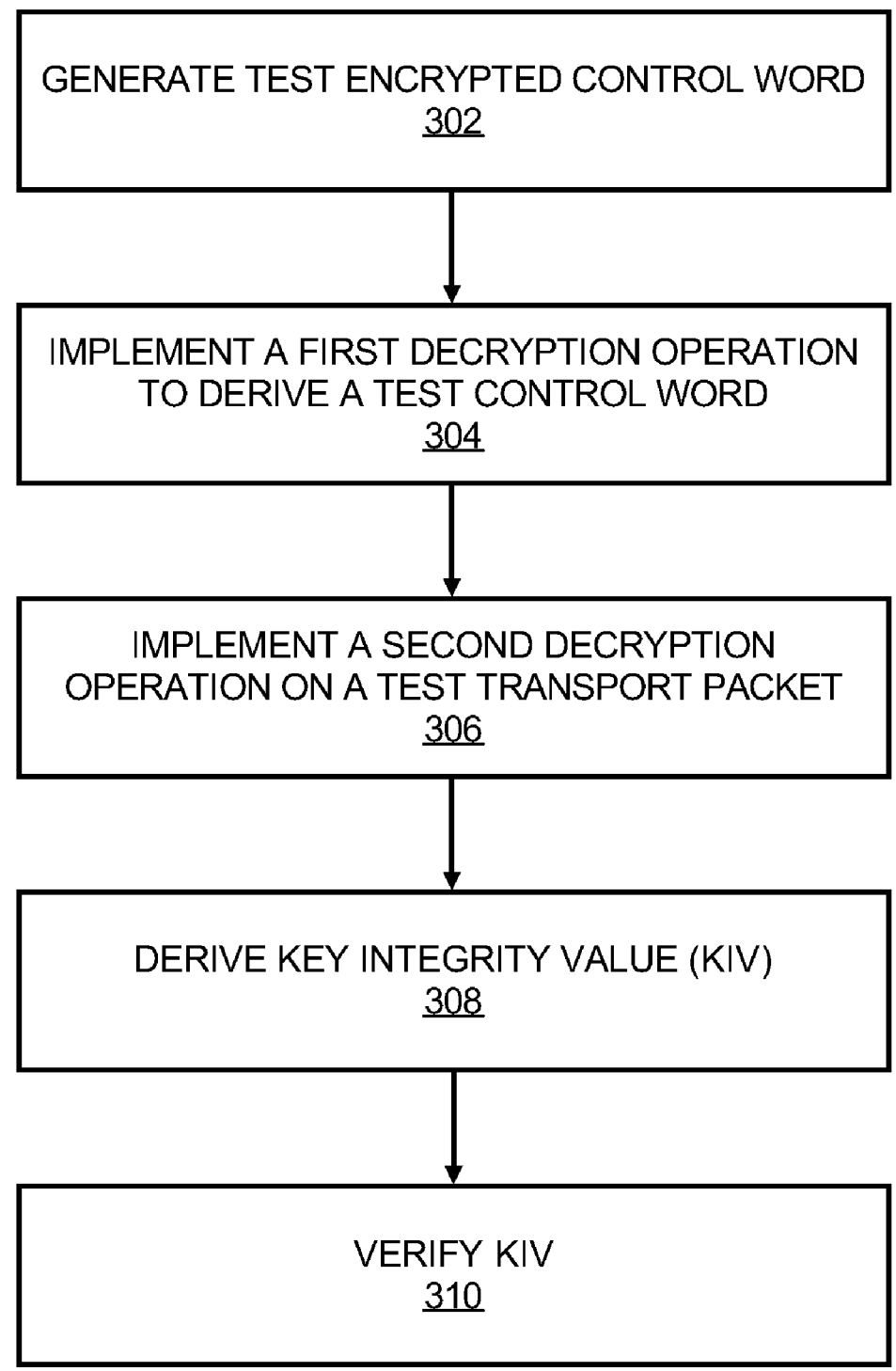
FIG. 3 shows a flow diagram of a method for testing a transport packet decrypting module of a client device, according to an embodiment of the present invention.
Figure 4:
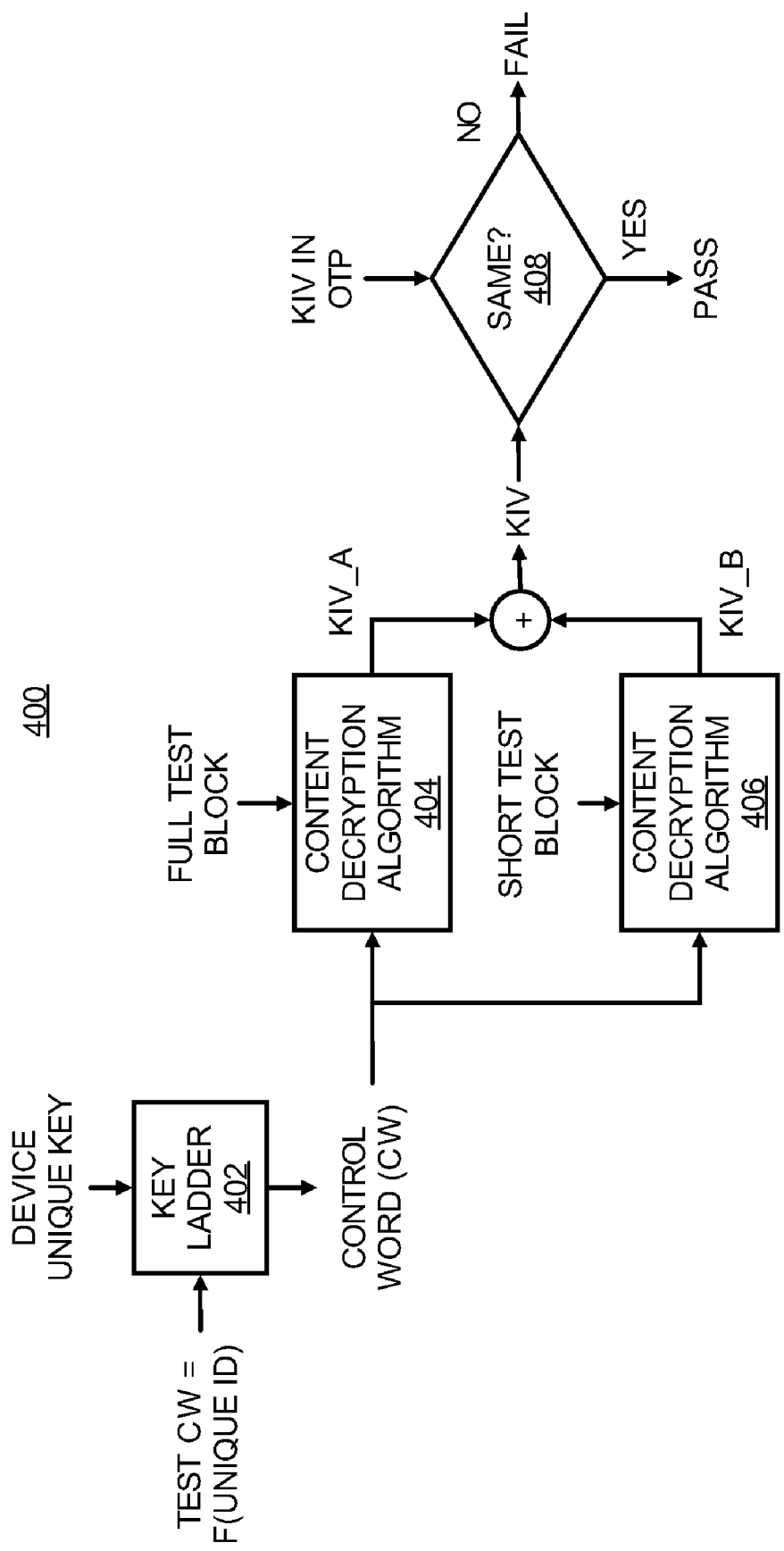
FIG. 4 illustrates a functional block diagram of a method for testing a transport packet decrypting module of a client device, according to an embodiment of the present invention.

Various manners in which the modules 202-212 of the KIV processing apparatus 114 may be implemented are described in greater detail with respect to FIGS. 3 and 4, which respectively depict a flow diagram of a method 300 and a functional block diagram 400 for testing a transport packet decrypting module of a client device 106, according to embodiments of the invention. It should be apparent to those of ordinary skill in the art that the method 300 and the functional block diagram 400 represent generalized illustrations and that other steps may be added or existing steps may be removed, modified or rearranged without departing from the scopes of the method 300 and the functional block diagram 400.

The descriptions of the method 300 and the functional block diagram 400 are made with particular reference to the KIV processing apparatus 114 depicted in FIGS. 1 and 2. It should, however, be understood that the method 300 and the functional block diagram 400 may be implemented in an apparatus that differs from the KIV processing apparatus 114 without departing from the scopes of the method 300 and the functional block diagram 400.

With reference first to FIG. 3, at step 302, a test encrypted control word is generated, for instance, by the test control word (TCW) generating module 202. The TCW generating module 202 may generate the test encrypted control word to be equivalent to the original terms used to generate the KIV stored in the memory 110 of the client device 106, such as the OTP memory. For example, the TCW generating module 202 may formulate the test encrypted control word from a public identity of a specific hardware unit (e.g., chip) of the client device 106 that was used to generate the KIV stored in the OTP memory of the client device 106. By way of particular example, for a 5-byte chip ID, three bytes of zero may be appended to form an 8-byte test encrypted control word. Here, the test encrypted control word is treated as an encrypted value, but does not come from the encryption of an original control word. Instead, the test encrypted control word is generated from the pre-defined TCW generating rule.

At step 304, a first decryption operation of the transport packet decrypting module 112 is implemented on the test encrypted control word using a content decryption key ladder, for instance, by the TCW decryption module 204, to derive a test control word. As discussed above, the content decryption key ladder represents a hierarchy of keys used to derive the control word. In one embodiment, the transport packet decrypting module 112 may decrypt the test encrypted control word using a global key ladder with a system wide global key. In another embodiment, the transport packet decrypting module 112 may decrypt the test encrypted control word may be decrypted using a unique key ladder with an OTP device unique key.

At step 306, a second decryption operation of the transport packet decrypting module 112 is implemented on a test transport packet using the test control word via a predetermined content decryption algorithm, for instance, by the transport packet decryption module 206. By way of particular example, the second decryption operation of the transport packet decrypting module 112 is implemented on the test transport packet, in which the test transport packet contains a payload of at least one full encryption block (e.g., 8 bytes for DES encryption algorithm used in SCTE52), using the control word via SCTE52 algorithm. This would invoke the use of SCTE52 IV A. The decrypted result is a first KIV (e.g., KIV_A). In addition, the second decryption operation of the transport packet decrypting module 112 is implemented on the test transport packet, in which the test transport packet contains a payload of less than one full encryption block (e.g., 4 bytes), using the test control word via the SCTE52 algorithm. This would invoke the use of SCTE52 IV B. The decrypted result is a second KIV (e.g., KIV_B). The values of the test transport packets are pre-defined and are equivalent to those values used to generate the KIV, for instance, stored in the OTP memory of the client device 106.

At step 308, a KIV is derived from the decrypted test transport packet, for instance, by the KIV deriving module 208. Step 308 may be performed in response to the decrypted results from step 306. By way of example, the KIV may be calculated based on the first KIV and the second KIV, for instance, the results of a function applied to the first KIV and the second KIV. By way of particular example, the KIV is a concatenation of the first KIV (KIV_A) and the second KIV (KIV_B). In one regard, the KIV is unique to the transport packet decrypting module 112.

At step 310, a determination as to whether the derived KIV at step 308 is identical to a value (such as a KIV) stored in the client device 106 is made, for instance, by the KIV verification module 210. The value stored in the client device 106 may be stored in the memory 110, such as an OTP memory, of the client device 106. Since the value (such as the KIV) stored on the OTP memory is unique to a client device, the value is not part of the firmware of the client device 106. More particularly, for instance, the KIV verification module 210 may determine whether the KIV derived by the KIV processing apparatus 114 is the same as the value stored in the memory 110 of the client device 106. If the results are the same, it may be assumed that the involved algorithms and parameters are correct. In one embodiment, if available memory is limited, a truncated version of the KIV may be stored instead. For example, if n-bytes are available in the memory 110, the KIV may be set to KIV_A_n XOR KIV_B_n. Here, the KIV_A_n is n-byte of KIV_A (e.g., n most significant byte) and the KIV_B_n is n-byte of KIV_B.

At step 312, the results of the verification performed at step 310 may be outputted, for instance, by the output module 212. The results may be outputted to any suitable output device, such as, a display, a printer, a computing device, etc. Thus, for instance, a user may view the results to determine whether the transport packet decrypting module 112 is operating properly.

With reference now to FIG. 4, a test encrypted control word, which may be a function of the client device 106 identity, is inputted into a content decryption key ladder decryption algorithm 402 of the transport packet decrypting module 112. Implementation of the content decryption key ladder decryption 402 on the test encrypted control word, which is also depicted as receiving a unique key of the client device 106, results in a test control word.

As also shown in FIG. 4, the test control word is inputted into a first content decryption algorithm 404 and a second content decryption algorithm 406. The first content decryption algorithm 404 receives as input, the test transport packet containing a payload of a full pre-determined test encryption block (e.g., 8 bytes). In addition, the second content decryption algorithm 406 receives as input, the test transport packet containing a payload of a short pre-determined test encryption block (e.g., 4 bytes). The decrypted result from the first content decryption algorithm 404 is a first KIV (KIV_A) and the decrypted result from the second content decryption algorithm 406 is a second KIV (KIV_B). A final KIV is derived from the first KIV and the second KIV, through, for instance, a concatenation of the first KIV and the second KIV. The KIV thus derived is compared 408 with a value (KIV) in the OTP memory of the client device 106 to determine whether the derived KIV is identical to a KIV in the client device, such as the OTP memory, is made. If the derived KIV is identical to the stored value, the transport packet decrypting module 112 may be considered to have passed and thus considered to be functioning properly. However, if the derived KIV differs from the stored value, the transport packet decrypting module 112 may be considered to have failed and thus considered to be functioning improperly.

The key ladder 402, the first content decryption algorithm 404, and the second content decryption algorithm 406 generally implement some parameters that are secret and/or proprietary and are thus not typically accessible to a general purpose processor of the client device 106. According to an embodiment, the parameters comprise Initialization Vectors (IVs) for Ciphertext Block Chaining (CBC) by the transport packet decrypting module 112. In one regard, the method 300 and the functional block diagram 400 show that the client device 106 may be tested to determine whether these parameters were correctly loaded onto a chip of the client device 106.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
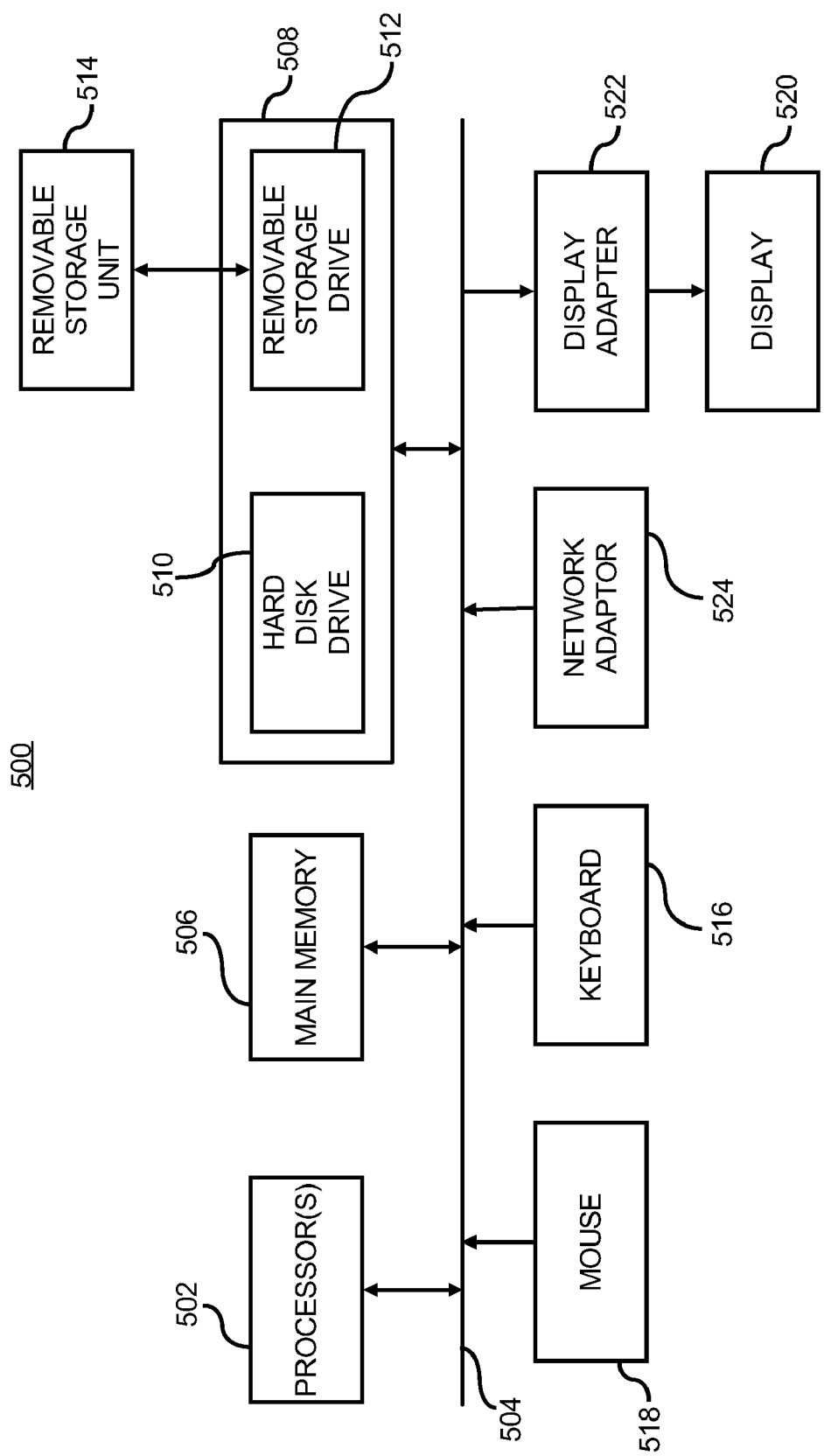
FIG. 5 shows a block diagram of a computer system that may be used as a platform for implementing or executing one or more of the processes depicted in FIGS. 3 and 4, according to an embodiment of the present invention.

FIG. 5 illustrates a block diagram of a computing apparatus 500 configured to implement or execute one or more of the processes depicted in FIGS. 3 and 4, according to an embodiment. It should be understood that the illustration of the computing apparatus 500 is a generalized illustration and that the computing apparatus 500 may include additional components and that some of the components described may be removed and/or modified without departing from a scope of the computing apparatus 500.

The computing apparatus 500 includes a main processor 502 that may implement or execute some or all of the steps described in one or more of the processes depicted in FIGS. 3 and 4. For example, the processor 502 is configured to implement one or more programs stored in the memory 508 to generate a test encrypted control word, to implement the decryption of the test encrypted control word using a content decryption key ladder to derive a test control word, to implement the decryption of a test transport packet using the test control word via a predetermined content decryption algorithm, to derive a KIV from the decrypted test transport packet; and to compare the derived KIV with a value stored in the client device to verify whether the transport packet decrypting module of the client device is functioning properly.

Commands and data from the processor 502 are communicated over a communication bus 504. The computing apparatus 500 also includes a main memory 506, such as a random access memory (RAM), where the program code for the processor 502 may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for one or more of the processes depicted in FIGS. 3 and 4 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

Through implementation of the method and apparatus disclosed herein, a KIV for a client device may be derived to verify whether the client device is performing the transport packet decryption process properly and without compromising the security of the client device. More particularly, the method and apparatus disclosed herein are configured to cause the transport packet decryption process to be performed on a test control word without having to reveal the keys or other parameters to a general purpose processor used in the client device to perform the transport packet decryption process. In addition, because the KIV is derived through use of the transport packet decrypting module of a client device, the KIV may be compared with a previously stored KIV of the client device to determine whether the transport packet decrypting module is functioning properly. In one regard, the comparison may be used to determine whether the transport packet decrypting module of the client device is operating properly because the KIV programmed on the chip of the client device is pre-computed according to the same procedure used herein to derive the KIV. As such, the determination as to whether the transport packet decrypting module is functioning properly may be made in a relatively simple, secure, and effective manner.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for testing a transport packet decrypting module of a client device, said method comprising steps performed by a processing apparatus of:
    implementing a first decryption operation of the transport packet decrypting module on a test encrypted control word using a content decryption key ladder to derive a test control word;
    implementing a second decryption operation of the transport packet decrypting module on a test transport packet using the test control word via a predetermined content decryption algorithm, wherein implementing the second decryption operation further comprises:
      implementing the second decryption operation of the transport packet decrypting module on a test transport packet to decrypt the test transport packet, wherein the test transport packet contains a payload of at least one full encryption block, using the test control word via a first predetermined content decryption algorithm to derive a first KIV;
      implementing the second decryption operation of the transport packet decrypting module on the test transport packet to decrypt the test transport packet, wherein the test transport packet contains a payload of less than one full encryption block, using the test control word via a second predetermined content decryption algorithm to derive a second KIV;
    deriving a key integrity value (KIV) from the decrypted test transport packet; and
    comparing the derived KIV with a value stored in the client device to verify whether the transport packet decrypting module of the client device is functioning properly.

2. The method according to claim 1, further comprising:
    generating the test control word from the test encrypted control word to be equivalent to a term employed to generate the value stored in the client device.

3. The method according to claim 1, wherein implementing the first decryption operation further comprises implementing a decryption operation of the transport packet decrypting module using a global key ladder with a system wide global key on the test control word.

4. The method according to claim 1, wherein implementing the second decryption operation further comprises implementing a decryption operation on the transport packet decrypting module using a unique key ladder with a device unique key on the test control word.

5. The method according to claim 1, wherein implementing at least one of the first decryption operation and the second decryption operation further comprises including one or more parameters that are at least one of secret and proprietary to the client device, and wherein comparing the derived KIV with the value stored in the client device further comprises comparing the derived KIV with the value stored in the client device to determine whether the one or more parameters were correctly loaded onto the client device.

6. The method according to claim 5, wherein the one or more parameters comprise initialization vectors for ciphertext block chaining in the transport packet decrypting module.

7. The method according to claim 1, wherein deriving the KIV further comprises deriving the KIV as a concatenation of the first KIV and the second KIV.

8. The method according to claim 1, further comprising:
    determining that the transport packet decrypting module is operating properly in response to the derived KIV being identical to the value stored in the client device; and
    determining that the transport packet decrypting module is functioning improperly in response to the derived KIV differing from the value stored in the client device.

9. The method according to claim 1, further comprising:
    creating a truncated version of the derived KIV; and
    comparing the truncated version of the derived KIV with a truncated version of a value stored in the client device to verify whether the transport packet decrypting module is functioning properly in the client device.

10. An apparatus for testing a transport packet decrypting module of a client device, said apparatus comprising:
    a memory storing one or more modules configured:
      to implement a first decryption operation of the transport packet decrypting module on a test encrypted control word using a content decryption key ladder to derive a test control word,
      to implement a second decryption operation of the transport packet decrypting module on a test transport packet using the test control word via a predetermined content decryption algorithm,
      to implement the second decryption operation of the transport packet decrypting module on a test transport packet that contains a payload of at least one full encryption block, using the test control word via a first predetermined content decryption algorithm to derive a first KIV,
      to implement the second decryption operation of the transport packet decrypting module on a test transport packet that contains a payload of less than one full encryption block, using the test control word via a second predetermined content decryption algorithm to derive a second KIV,
      to derive a key integrity value (KIV) through application of a function on the first KIV and the second KIV, and
      to compare the derived KIV with a value stored in the client device to verify whether the transport packet decrypting module of the client device is functioning properly; and
    a processor configured to execute the one or more modules.

11. The apparatus according to claim 10, wherein the one or more modules are configured to generate the test control word from the test encrypted control word to be equivalent to a term employed to generate the KIV value stored in the client device.

12. The apparatus according to claim 10, wherein the one or more modules are further configured to implement the first decryption operation using a global key ladder with a system wide global key on the test control word.

13. The apparatus according to claim 10, wherein the one or more modules are further configured to implement the second decryption operation using a unique key ladder with a device unique key on the test control word.

14. The apparatus according to claim 10, wherein the one or more modules are further configured to implement at least one of the first decryption operation and the second decryption operation using one or more parameters that are at least one of secret and proprietary to the client device, and to compare the derived KIV with the value stored in the client device to determine whether the one or more parameters were correctly loaded onto the client device.

15. The apparatus according to claim 14, wherein the one or more parameters comprise initialization vectors for ciphertext block chaining in the transport packet decrypting module.

16. A non-transitory computer readable storage medium on which is embedded one or more computer programs, said one or more computer programs implementing a method for testing a transport packet decrypting module of a client device, said one or more computer programs comprising a set of instructions for:

implementing a first decryption operation of the transport packet decrypting module on a test encrypted control word using a content decryption key ladder to derive a test control word;

implementing a second decryption operation of the transport packet decrypting module on a test transport packet using the test control word via a predetermined content decryption algorithm;

implementing the second decryption operation of the transport packet decrypting module on a test transport packet that contains a payload of at least one full encryption block, and using the test control word via a first predetermined content decryption algorithm to derive a first KIV;

implementing the second decryption operation of the transport packet decrypting module on the test transport packet to decrypt a test transport packet, that contains a payload of less than one full encryption block, and using the test control word via a second predetermined content decryption algorithm to derive a second KIV;

deriving a key integrity value (KIV) from the first KIV and the second KIV; and comparing the derived KIV with a value stored in the client device to verify whether the transport packet decrypting module of the client device is functioning properly.

* * * * *